US007725604B1

(12) United States Patent
Levenberg

(10) Patent No.: US 7,725,604 B1
(45) Date of Patent: May 25, 2010

(54) IMAGE RUN ENCODING

(75) Inventor: Richard Mark Levenberg, Lafayette, CA (US)

(73) Assignee: PalmSource Inc., Sunnyvale, CA (US)

( * ) Notice: Subject to any disclaimer, the term of this patent is extended or adjusted under 35 U.S.C. 154(b) by 1068 days.

(21) Appl. No.: 09/844,925

(22) Filed: Apr. 26, 2001

(51) Int. Cl.
*G06F 15/16* (2006.01)
*G06F 17/00* (2006.01)

(52) U.S. Cl. ....................... 709/246; 709/231; 709/236; 715/252

(58) Field of Classification Search ................. 709/217, 709/246, 231, 236, 218; 715/202, 229, 234, 715/252
See application file for complete search history.

(56) References Cited

U.S. PATENT DOCUMENTS

| | | | | |
|---|---|---|---|---|
| 5,880,740 | A * | 3/1999 | Halliday et al. | 345/629 |
| 5,897,644 | A * | 4/1999 | Nielsen | 715/210 |
| 6,286,018 | B1 * | 9/2001 | Pitkow et al. | 715/513 |
| 6,345,279 | B1 * | 2/2002 | Li et al. | 707/104.1 |
| 6,438,575 | B1 * | 8/2002 | Khan et al. | 709/200 |
| 6,445,822 | B1 * | 9/2002 | Crill et al. | 382/218 |
| 6,449,639 | B1 * | 9/2002 | Blumberg | 709/217 |
| 6,457,030 | B1 * | 9/2002 | Adams et al. | 715/523 |
| 6,486,908 | B1 * | 11/2002 | Chen et al. | 348/39 |
| 6,510,406 | B1 * | 1/2003 | Marchisio | 704/9 |
| 6,535,896 | B2 * | 3/2003 | Britton et al. | 715/523 |
| 6,539,420 | B1 * | 3/2003 | Fields et al. | 709/206 |
| 6,542,546 | B1 * | 4/2003 | Vetro et al. | 375/240.12 |
| 6,546,397 | B1 * | 4/2003 | Rempell | 707/102 |
| 6,553,410 | B2 * | 4/2003 | Kikinis | 709/218 |
| 6,563,517 | B1 * | 5/2003 | Bhagwat et al. | 715/735 |
| 6,581,094 | B1 * | 6/2003 | Gao | 709/220 |
| 6,684,257 | B1 * | 1/2004 | Camut et al. | 709/246 |
| 6,704,024 | B2 * | 3/2004 | Robotham et al. | 345/581 |
| 6,704,798 | B1 * | 3/2004 | Mogul | 709/246 |
| 6,711,291 | B1 * | 3/2004 | Stubler et al. | 382/195 |
| 6,792,575 | B1 * | 9/2004 | Samaniego et al. | 715/202 |
| 6,862,710 | B1 * | 3/2005 | Marchisio | 715/501.1 |
| 6,870,547 | B1 * | 3/2005 | Crosby et al. | 345/619 |
| 6,925,595 | B1 * | 8/2005 | Whitledge et al. | 715/234 |
| 6,930,791 | B2 * | 8/2005 | Jackelen | 358/1.15 |
| 6,947,990 | B2 * | 9/2005 | Miller et al. | 709/226 |
| 6,964,009 | B2 * | 11/2005 | Samaniego et al. | 715/202 |
| 6,983,331 | B1 * | 1/2006 | Mitchell et al. | 709/246 |
| 6,999,609 | B2 * | 2/2006 | Eck et al. | 382/132 |
| 7,010,751 | B2 * | 3/2006 | Shneiderman | 715/764 |

(Continued)

*Primary Examiner*—William C Vaughn, Jr.
*Assistant Examiner*—Kristie D Shingles
(74) *Attorney, Agent, or Firm*—Berry & Associates P.C.

(57) ABSTRACT

A method and apparatus for delivering web-page content for a limited-display computing device are disclosed. In one embodiment, upon receiving a web page request from a limited-display computing device (e.g., a palmtop computing device), a transcoding proxy server then transmits the web page request to a server computer that contains the requested web page document. Upon receiving the web page document corresponding to the web page request, the received web page document is searched for a run of images. If the web page document does not include a run of images, the web page document is transcoded using the normal transcoding process. However, when a run of images is found in the document, the images in the run of images are rendered to generate a composite image which is scaled. The remainder of the web page document is transcoded using the normal transcoding process and the results are transmitted, along with the scaled composite image, to the limited-display computing device.

20 Claims, 12 Drawing Sheets

U.S. PATENT DOCUMENTS

| | | | | |
|---|---|---|---|---|
| 7,050,102 | B1 * | 5/2006 | Vincent | 348/333.02 |
| 7,098,914 | B1 * | 8/2006 | Katayama et al. | 345/427 |
| 7,123,291 | B2 * | 10/2006 | Horie | 348/218.1 |
| 7,210,100 | B2 * | 4/2007 | Berger et al. | 715/229 |
| 7,299,289 | B1 * | 11/2007 | Lorenz et al. | 709/231 |
| 7,355,608 | B1 * | 4/2008 | Beach | 345/629 |
| 7,516,403 | B1 * | 4/2009 | Fisher et al. | 715/239 |
| 2001/0032254 | A1 * | 10/2001 | Hawkins | 709/219 |
| 2001/0049596 | A1 * | 12/2001 | Lavine et al. | 704/9 |
| 2001/0056460 | A1 * | 12/2001 | Sahota et al. | 709/201 |
| 2002/0038351 | A1 * | 3/2002 | Khan et al. | 709/217 |
| 2002/0049792 | A1 * | 4/2002 | Wilcox et al. | 707/522 |
| 2002/0065074 | A1 * | 5/2002 | Cohn et al. | 455/422 |
| 2002/0133569 | A1 * | 9/2002 | Huang et al. | 709/219 |
| 2003/0034991 | A1 * | 2/2003 | Fitzsimons et al. | 345/660 |

* cited by examiner

10b

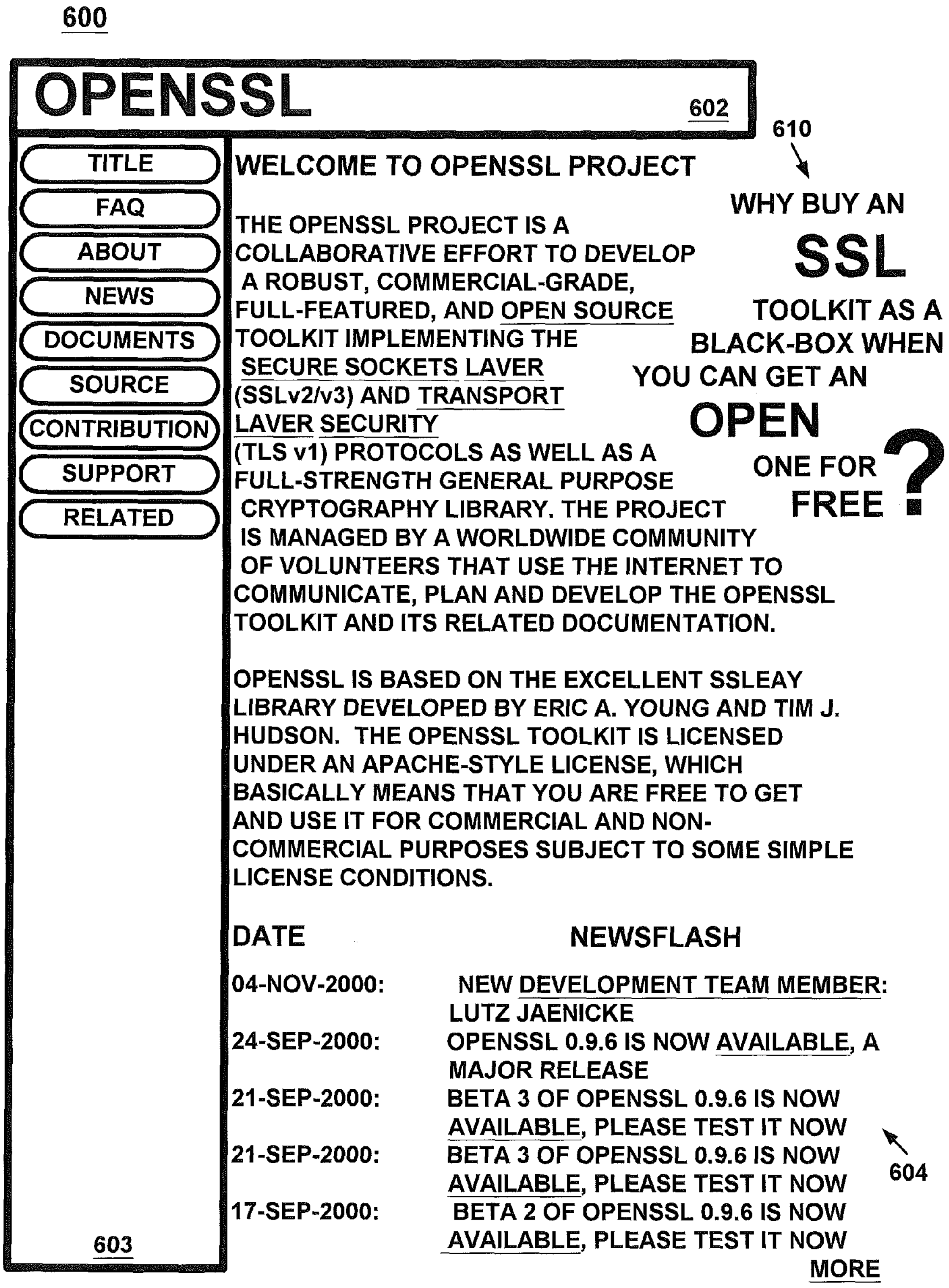

OPENSSL  602

- TITLE
- FAQ
- ABOUT
- NEWS
- DOCUMENTS
- SOURCE
- CONTRIBUTION
- SUPPORT
- RELATED

603

WELCOME TO OPENSSL PROJECT

THE OPENSSL PROJECT IS A
COLLABORATIVE EFFORT TO DEVELOP
A ROBUST, COMMERCIAL-GRADE,
FULL-FEATURED, AND OPEN SOURCE
TOOLKIT IMPLEMENTING THE
SECURE SOCKETS LAVER
(SSLv2/v3) AND TRANSPORT
LAVER SECURITY
(TLS v1) PROTOCOLS AS WELL AS A
FULL-STRENGTH GENERAL PURPOSE
CRYPTOGRAPHY LIBRARY. THE PROJECT
IS MANAGED BY A WORLDWIDE COMMUNITY
OF VOLUNTEERS THAT USE THE INTERNET TO
COMMUNICATE, PLAN AND DEVELOP THE OPENSSL
TOOLKIT AND ITS RELATED DOCUMENTATION.

OPENSSL IS BASED ON THE EXCELLENT SSLEAY
LIBRARY DEVELOPED BY ERIC A. YOUNG AND TIM J.
HUDSON. THE OPENSSL TOOLKIT IS LICENSED
UNDER AN APACHE-STYLE LICENSE, WHICH
BASICALLY MEANS THAT YOU ARE FREE TO GET
AND USE IT FOR COMMERCIAL AND NON-
COMMERCIAL PURPOSES SUBJECT TO SOME SIMPLE
LICENSE CONDITIONS.

610 → WHY BUY AN SSL TOOLKIT AS A BLACK-BOX WHEN YOU CAN GET AN OPEN ONE FOR FREE?

| DATE | NEWSFLASH |
|---|---|
| 04-NOV-2000: | NEW DEVELOPMENT TEAM MEMBER: LUTZ JAENICKE |
| 24-SEP-2000: | OPENSSL 0.9.6 IS NOW AVAILABLE, A MAJOR RELEASE |
| 21-SEP-2000: | BETA 3 OF OPENSSL 0.9.6 IS NOW AVAILABLE, PLEASE TEST IT NOW |
| 21-SEP-2000: | BETA 3 OF OPENSSL 0.9.6 IS NOW AVAILABLE, PLEASE TEST IT NOW |
| 17-SEP-2000: | BETA 2 OF OPENSSL 0.9.6 IS NOW AVAILABLE, PLEASE TEST IT NOW |

604

MORE

600(CONT.)

THIS SOFTWARE PACKAGE USES STRONG CRYPTOGRAPHY, SO EVEN IF IT IS CREATED, MAINTAINED AND DISTRIBUTED FROM LIBERAL COUNTRIES IN EUROPE (WHERE IT IS LEGAL TO DO THIS), IT FALLS UNDER CERTAIN EXPORT/IMPORT AND/OR USE RESTRICTIONS IN SOME OTHER PARTS OF THE WORLD.

PLEASE REMEMBER THAT EXPORT/IMPORT AND/OR USE OF STRONG CRYPTOGRAPHY SOFTWARE, PROVIDING CRYPTOGRAPHY HOOKS OR EVEN JUST COMMUNICATING TECHNICAL DETAILS ABOUT CRYPTOGRAPHY SOFTWARE IS ILLEGAL IN SOME PARTS OF THE WORLD. SO, WHEN YOU IMPORT THIS PACKAGE TO YOUR COUNTRY, RE-DISTRIBUTE IT FROM THERE OR EVEN JUST MAIL TECHNICAL SUGGESTIONS OR EVEN SOURCE PATCHES TO THE AUTHOR OR OTHER PEOPLE YOU ARE STRONGLY ADVISED TO PAY CLOSE ATTENTION TO ANY EXPORT/IMPORT AND/OR USE LAWS WHICH APPLY TO YOU. THE AUTHORS OF OPENSSL ARE NOT LIABLE FOR ANY VIOLATIONS YOU MAKE HERE. SO BE CAREFUL, IT IS YOUR RESPONSIBILITY.

CREDIT INFORMATION: THIS PRODUCT INCLUDES CRYPTOGRAPHIC SOFTWARE WRITTEN BY ERIC A. YOUNG (EAY@CRYPTSOFT.COM). THIS PRODUCT INCLUDES SOFTWARE WRITTEN BY TIM J. HUDSON (TJH@CRYPTSOFT.COM).

WEBSITE DESIGNED BY RALF S. ENGELSCHALL AND GENERATED WITH WEBSITE META LANGUAGE (WML).
ALL MARKUP CODE AND GRAPHICS ON THIS WEBSITE ARE COPYRIGHT© 1999 THE OPENSSL PROJECT, ALL RIGHTS RESERVED.
THIS WEBSITE IS SERVED BY AN APACHE WEB SERVER ENVIRONMENT.
HARDWARE AND BANDWIDTH PROVIDED BY DEPARTMENT OF ELECTRICAL ENGINEERING OF SWISS FEDERAL INSTITUTE OF TECHNOLOGY, ZURICH.

```
<table width = "100%" cellspacing = "0" cellpadding = "0" border = "0">
    <tr>
        <td align = "left" width = "100" bgcolor = "#666699"><img src = "images/page-head-tl.jpg" alt = "OpenSSL" width = "100" height = "80"></td>     ← 902
        <td align = "left" colspan = "2" width = "600" bgcolor = "#666699"><img src = "images/page-head-tm.jpg" alt =""" width = "600" height = "80"></td>     ← 903
        <td align = "right" width = "20" bgcolor = "#666699"></td>
        <td align = "right" width = "50" bgcolor = "#666699"></td>
    </tr>
    <tr>
        <td align = "left" width = "100"><img src = "images/page-head-bl.jpg" alt="" width = "100" height = "20"></td>     ← 904
        <td align ="left" width = "20"><img src="images/page-head-bm.jpg" alt = "" width = "20" height ="20"></td>     ← 905
        <td align = "left" width = "100%" bgcolor = "#ffffff"></td
        <td align = "right" width ="20"><img src = "images/page-corner-tr.gif" alt = "" width = "20" height = "20"></td>     ← 906
        <td align = "right" width = "50" bgcolor = "#666699"></td>
    </tr>
    ...
```

901 (brace grouping the rows)

900

```
function nb_imgOver(imgName, descript) {
    if (document.images) {
        document[imgName].src = eval(imgName + "_o.src");
        self.status = descript;
    }
}
if (document.images) {
    nb_img_FAQ_n = new Image();
    nb_img_FAQ_n.src = "images/page-navbar-fq-n.jpg";          ← 942
    nb_img_FAQ_o = new Image();
    nb_img_FAQ_o.src = "images/page-navbar-fq-s.jpg";          ← 943
    nb_img_about_n = new Image();
    nb_img_about_n.src = "images/page-navbar-ab-n.jpg";        ← 944
    nb_img_about_o = new Image();
    nb_img_about_o.src = "images/page-navbar-ab-s.jpg";        ← 945
    nb_img_news_n = new Image();
    nb_img_news_n.src = "images/page-navbar-ne-n.jpg";         ← 946
    nb_img_news_o = new Image();
    nb_img_news_o.src = "images/page-navbar-ne-s.jpg";         ← 947
    nb_img_docs_n = new Image();
    nb_img_docs_n.src = "images/page-navbar-do-n.jpg";         ← 948
    nb_img_docs_o = new Image();
    nb_img_docs_o.src = "images/page-navbar-do-s.jpg";         ← 949
940 nb_img_source_n = new Image();
    nb_img_source_n.src = "images/page-navbar-so-n.jpg";       ← 950
    nb_img_source_o = new Image();
    nb_img_source_o.src = "images/page-navbar-so-s.jpg";       ← 951
    nb_img_contrib_n = new Image();
    nb_img_contrib_n.src = "images/page-navbar-co-n.jpg";      ← 952
    nb_img_contrib_o = new Image();
    nb_img_contrib_o.src = "images/page-navbar-co-s.jpg";      ← 953
    nb_img_support_n = new Image();
    nb_img_support_n.src = "images/page-navbar-su-n.jpg";      ← 954
    nb_img_support_o = new Image();
    nb_img_support_o.src = "images/page-navbar-su-s.jpg";      ← 955
    nb_img_related_n = new Image();
    nb_img_related_n.src = "images/page-navbar-re-n.jpg";      ← 956
    nb_img_related_o = new Image();
    nb_img_related_o.src = "images/page-navbar-re-s.jpg";      ← 957
```

FIGURE 10

IMAGE RUN ENCODING

BACKGROUND OF THE INVENTION

1. Field of the Invention

The present invention relates to the field of computer systems. More specifically, the present invention relates to a method and apparatus for coupling information to a limited-display computing device.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

The latest generation of palmtop computers are enhanced with the capability to be coupled to the Internet using wired or wireless technology. This gives their user's access to an extremely large amount of information. However, Internet web pages are typically developed for color display screens having a resolution of 800×600 or larger. This presents a problem for palmtop computer systems and other computer systems having limited display capabilities (e.g., small size displays and limited color displays).

Web pages use numerous small images in order to create a full-size display, some of which may or may not be displayed at any one time (e.g., images displayed on mouseover). Because of the large number of images and the complex relationship between images, it is difficult to know which images should be displayed on the limited-display computer system. For example, if all of the images that make up a web page that includes a complex header and text were to be transcoded vertically along with the text in a size suitable for display on a limited-display computing device, the resulting would include a long sequence of irrelevant images followed by text. The long sequence of irrelevant images (e.g., images displayed on mouseover) are burdensome to scroll through in order to get to the more relevant text. In addition, it would take an extensive amount of time to download such an extensive amount of images.

To overcome the aforementioned problems, various techniques have been developed for generating displays on computer systems having limited display capabilities. One technique, referred to as web scraping, requires that one or more person actually view an original web page on the Internet and determine which content is relevant and how the relevant content should be arranged. The scraped content is stored on a special web server that is accessible by the computing device having limited display capabilities. Though web scraping provides good images that include relevant information, only web pages that have been scraped are available. This significantly limits the user's Internet experience.

Another technique for enabling limited-display computing devices to handle web pages from the Internet involves the use of web clipping techniques. Web clipping techniques use a web clipping application that is installed on the limited-display computing system and that transmits a request to an Internet server for limited web content (a "web clipping") from a specific web page. The server then generates and transmits the web clipping to the requesting limited-display computer system. Though web clipping techniques provide access to the Internet, only those Internet servers that provide web clippings that are compatible with the particular web clipping application can be accessed. Thus, the use of web clipping techniques also significantly limits the user's Internet experience.

Another technique for enabling limited-display computing systems to handle web pages from the Internet involves the use of a transcoding proxy server. The transcoding proxy server access web pages in response to requests from a limited-display computer system and transcodes the web pages in a format that the small display screen of the limited-display computer system can handle. Because of the difficulties associated with transcoding images, transcoding proxy servers use a "best guess" processing of the web pages that strips out all of the web content that the small display screen cannot handle (e.g., images, Java, JavaScript, tables, etc.). The transcoded web pages are then transmitted to the limited-display computer system. However, "best guess" processing techniques provide a very poor quality web page product because of the loss of images that are an integral part of many web pages. In addition, the display does not fully convey the look and feel of a full-size web page display.

What is needed is a way to obtain information from web pages that is in a format that can be displayed by a palmtop computing system and that accurately conveys the look and feel of the full-size web page.

SUMMARY OF THE INVENTION

The present invention accurately conveys content of web pages in a format that can be displayed by a computing system having a limited display. More particularly, the apparatus and method of the present invention provides for generating composite images. The composite images are scaled and combined with text to create a display that conveys to a viewer the look and feel of the original full-size web page.

A transcoding proxy server and a method for transcoding web-page content for a limited-display computing device are disclosed. In one embodiment, the transcoding proxy computer receives a web page request from a limited-display computing device (e.g., a palmtop computing device). The transcoding proxy computer then transmits the web page request to a server computer that contains the requested web page document. The transcoding proxy computer then receives from the server computer a web page document corresponding to the web page request. The transcoding proxy computer then searches the received web page document for a run of images (a sequence of textual references to images that are directly adjoining or conceptually linked). If the web page document does not include a run of images, the web page document is transcoded using the normal "best guess" process.

However, when a run of textual references to images is found in the document, the transcoding proxy computer then renders each of the images in the run of textual references to images to generate a composite image. In the present embodiment, the composite image is rendered in an image size corresponding to the image size of a full-size display screen.

The transcoding proxy computer then scales the composite image and transmits the scaled composite image to the limited-display computing device. In the present embodiment, the remainder of the web page document (all of the web page document except for the previously rendered images in the run of textual references to images) is transcoded using the normal transcoding process and the results are transmitted to the limited-display computing device.

Because the scaled composite image that is transmitted to the limited-display computing device is proportionately scaled and includes all of the images that make up the full-size web-image, the image rendered on the limited-display viewing device fully conveys the look and feel of a full-size web page display. In addition, by combining images into a composite, the images are not transcoded individually, eliminating the confusion and inconvenience presented by the display of numerous individually transcoded images in a vertically extensive display. Also, there is no need to transmit an extensive amount of images, resulting in cost savings and reduced download time.

The present invention provides these advantages and others which will no doubt become obvious to those of ordinary skill in the art after having read the following detailed description of embodiments in accordance with the present invention.

BRIEF DESCRIPTION OF THE DRAWINGS

FIG. 6 is an exemplary full-size web page image in accordance with an embodiment of the present invention.

FIG. 9 is a diagram illustrating portions of an exemplary HTML web page document that is operable to generate portions of the full-size web page shown in FIG. 6 in accordance with an embodiment of the present invention.

FIG. 10 is a diagram illustrating portions of an exemplary HTML web page document that is operable to generate portions of the full-size web page shown in FIG. 6 in accordance with an embodiment of the present invention.

DETAILED DESCRIPTION OF THE INVENTION

Figure 1:
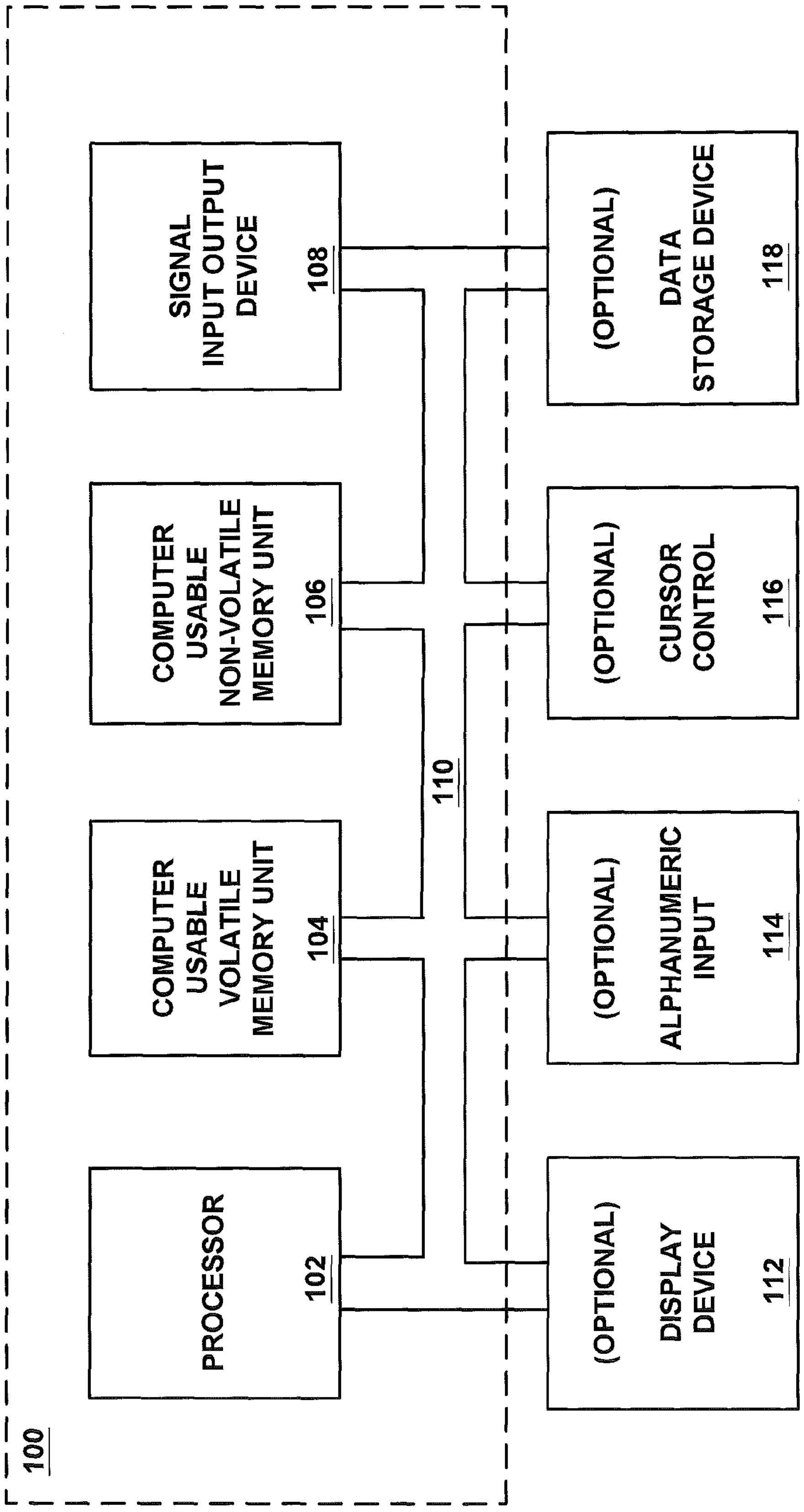
FIG. 1 is a logical block diagram of an exemplary computer system in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as “determining” or “transcoding” or “rendering” or “locating” or “searching” or “sending” or “receiving” or “recognizing” or “generating” or “scaling” or the like, refer to the action and processes of a computer system, or similar electronic computing device, that manipulates and transforms data. The data is represented as physical (electronic) quantities within the computer system’s registers and memories and is transformed into other data similarly represented as physical quantities within the computer system memories or registers or other such information storage, transmission, or display devices.

Exemplary Computer System in Accordance with the Present Invention

FIG. 1 is a block diagram of one embodiment of an exemplary computer system 100 used in accordance with the present invention. It should be appreciated that system 100 of the present embodiment is well suited to be implemented as any of a number of different types of computer (e.g., portable laptop computer, desktop computer, server computer, personal digital assistant, palmtop computer and the like). Within the following discussions of the present invention, certain processes and steps are discussed that are realized, in one embodiment, as a series of instructions (e.g., software program) that reside within computer readable memory units of computer system 100 and executed by processor(s) of system 100. When executed, the instructions cause system 100 to perform specific actions and exhibit specific behavior which is described in detail below.

In general, computer system 100 of FIG. 1 used by an embodiment of the present invention comprises an address/ data bus 110 for communicating information, one or more central processors 102 coupled with bus 110 for processing information and instructions. Central processor unit 102 may be a microprocessor or any other type of processor. The computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes a signal generating and receiving device 108 coupled with bus 110 for enabling system 100 to interface with other electronic devices. In one embodiment of the present invention, the communication interface 108 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, etc.

Optionally, computer system 100 can include a display device 112 which is coupled to bus 110 for displaying graphics and/or video. It should be appreciated that optional display device 112 may be a cathode ray tube (CRT), flat panel liquid crystal display (LCD), field emission display (FED), or any other display device suitable for displaying video and/or graphic images and alphanumeric characters recognizable to a user. Furthermore, system 100 can include an optional alphanumeric input device 114 including alphanumeric and, function keys coupled to the bus 110 for communicating information and command selections to the central processor (s) 102.

Additionally, the computing device 100 of FIG. 1 can include an optional cursor control or cursor directing device 116 coupled to the bus 110 for communicating user input information and command selections to the central processor (s) 102. The cursor directing device 116 can be implemented using a number of well known devices such as a mouse, a track-ball, a track pad, an optical tracking device, a touch screen, etc. Alternatively, it is appreciated that a cursor can be directed and/or activated via input from alphanumeric input device 114 using special keys and key sequence commands. The present invention is also well suited to directing a cursor by other means such as, for example, voice commands. In addition, the cursor directing device 116 can also be a remote control device (e.g., a universal remote control device having a number of buttons, dials, etc.) with an infra-red signal communication capability. System 100 can also include a computer usable mass data storage device 118 such as a magnetic or optical disk and disk drive (e.g., hard drive or floppy diskette) coupled with bus 110 for storing information and instructions.

Exemplary Network in Accordance with the Present Invention

Figure 2:
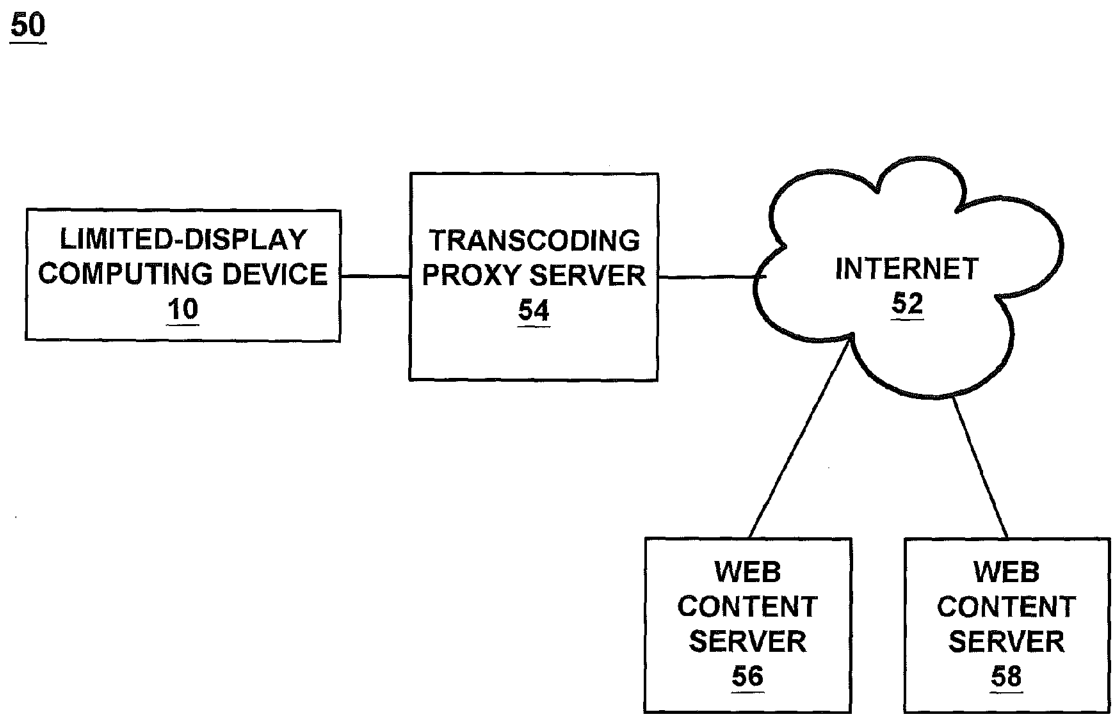
FIG. 2 is a block diagram of an exemplary network environment in accordance with one embodiment of the present invention.

FIG. 2 illustrates a system 50 that can be used in conjunction with the system and method for transcoding web-page content for a limited-display computing device of the present invention. It is appreciated that system 50 is exemplary only and that embodiments of the present invention can operate with other systems. System 50 includes limited-display computing device 10 which is coupled to transcoding proxy server 54. The connection between limited-display computing device 100 and transcoding proxy server 54 can be direct (e.g., a direct telephone link) or can be coupled through other devices or systems such as, for example, a Local Area Network (LAN), a Wide Area Network (WAN), a cellular network, a satellite network, etc. It is understood that limited-display computing system 10 has a display having limited capabilities (e.g., small size, limited color display capabilities, limited display resolution, etc.).

Transcoding proxy server 54 is coupled to the Internet 52. Transcoding Proxy server 54 can be directly coupled to the Internet 52 or can be coupled to the Internet 52 via other devices or systems such as, for example, a Local Area Network (LAN), a Wide Area Network (WAN), a cellular network, a satellite network, an Internet Service Provider (ISP), etc. In the present embodiment, transcoding proxy server 54 is a full-size computing device that includes components of computer 100 of FIG. 1.

Web content servers 56 and 58 are shown to couple to transcoding proxy server 54 via the Internet 52. However, it is appreciated that transcoding proxy server 54 could be coupled to web content servers 56 and 58 via other means including but not limited to a Local Area Network (LAN), a Wide Area Network (WAN), a cellular network, a satellite network, an Internet Service Provider (ISP), etc. In the present embodiment, web content servers 56 and 58 are full-size computing devices (e.g., servers) that provide web content in the form of web page documents. It is appreciated that transcoding proxy server 54 and web content servers 56 and 58 of the present embodiment may be implemented in a manner similar to computer 100 described above with reference to FIG. 1.

Within the present embodiment, one of the functions of transcoding proxy server 54 is to perform operations over the Internet 52 on behalf of limited-display computing system 10. For example, transcoding proxy server 54 may have a particular Internet address and it may act as a proxy device for limited-display computing system 10 over the Internet 52. As such, transcoding proxy server 54 may access, transcode, and deliver requested web content from the Internet 52 to limited-display computing system 10. In this manner, limited-display computing system 10 is able to receive web content that its limited sized display screen (e.g., display screen 105 of FIG. 3) is able to handle.

Figure 3:
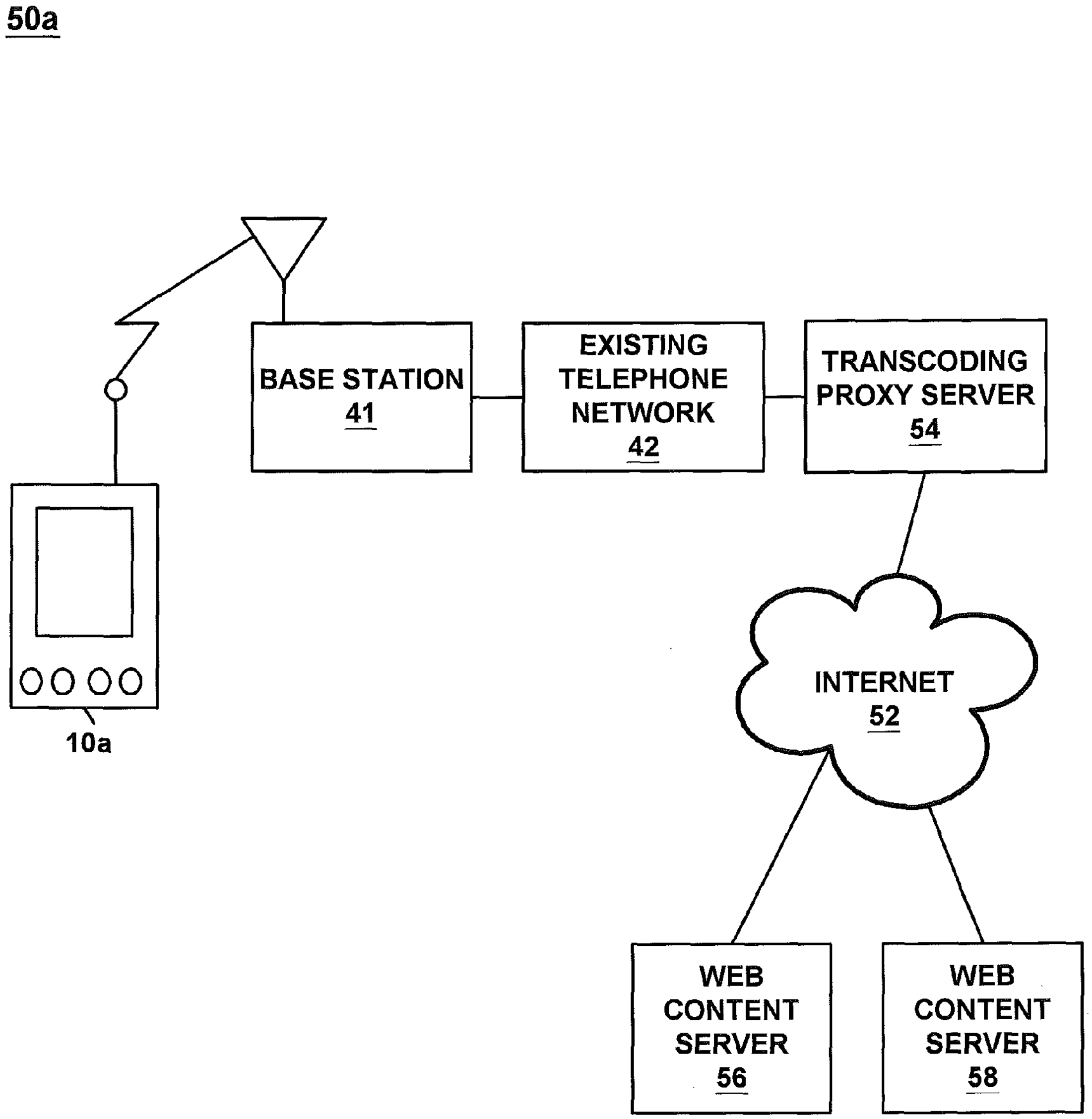
FIG. 3 is a block diagram of an exemplary network environment in which wireless communication methods are used in accordance with one embodiment of the present invention.

FIG. 3 is a block diagram of an exemplary network environment 50*a* in which communication between limited-display computing system 10 and transcoding proxy server 54 is coupled via wireless transmission. More particularly, limited-display computing system 10*a* communicates via wireless (e.g., radio) transmission with base station 41. Implemented in this manner, base station 41 enables limited-display computing system 10*a* to communicate with transcoding proxy server computer 54 via existing' public telephone network 42.

In the present embodiment, limited-display computing system 10*a* has the ability to transmit and receive data and information over a wireless communication interface (e.g., radio interface). In one embodiment, limited-display computing system 10*a* is a palmtop computer such as palmtop computer 10*b* shown in FIG. 4 that communicates with base station 41 via radio. Alternatively, limited-display computing system 10*a* can be any device capable of downloading and viewing images that are available on the Internet (e.g., mobile phones, pagers, Internet appliances, etc.) that has limited display capabilities.

Figure 4:
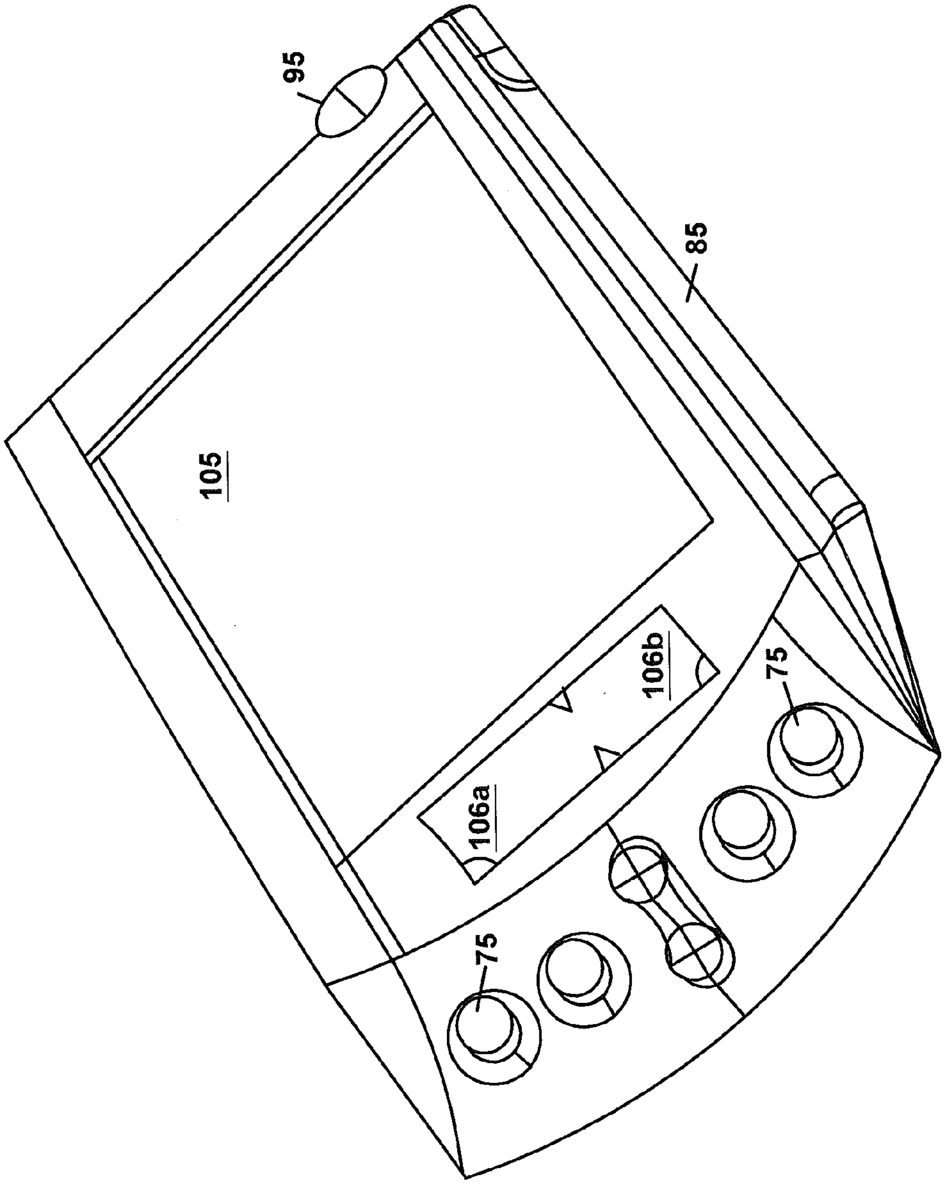
FIG. 4 is a top side perspective view of a limited-display computing device that is a palmtop computer system in accordance with an embodiment of the present invention.

FIG. 4 is a perspective illustration of the top face of an embodiment of a limited-display computing device 10*b* that is a palmtop computer system. System 10*b* is exemplary only. The top face contains a display screen 105 surrounded by a bezel or cover. The top face also contains one or more dedicated and/or programmable buttons 75 for selecting information and causing the computer system to implement functions. The on/off button 95 is also shown. A handwriting recognition pad or "digitizer" is illustrated that region 106*a* for recognition of alpha characters and region 106*b* is for recognition of numeric characters. Extendible antenna 85 allows for radio communication with other devices and systems. The display screen 105 is a touch screen able to register contact with the top surface of touch screen 105. In the present embodiment, display screen 105 is a four-color display screen (off, light gray, dark gray and black) that has a width of 160 pixels. However, alternatively, display screen 105 could be larger or smaller and could display more or fewer colors.

Figure 5:
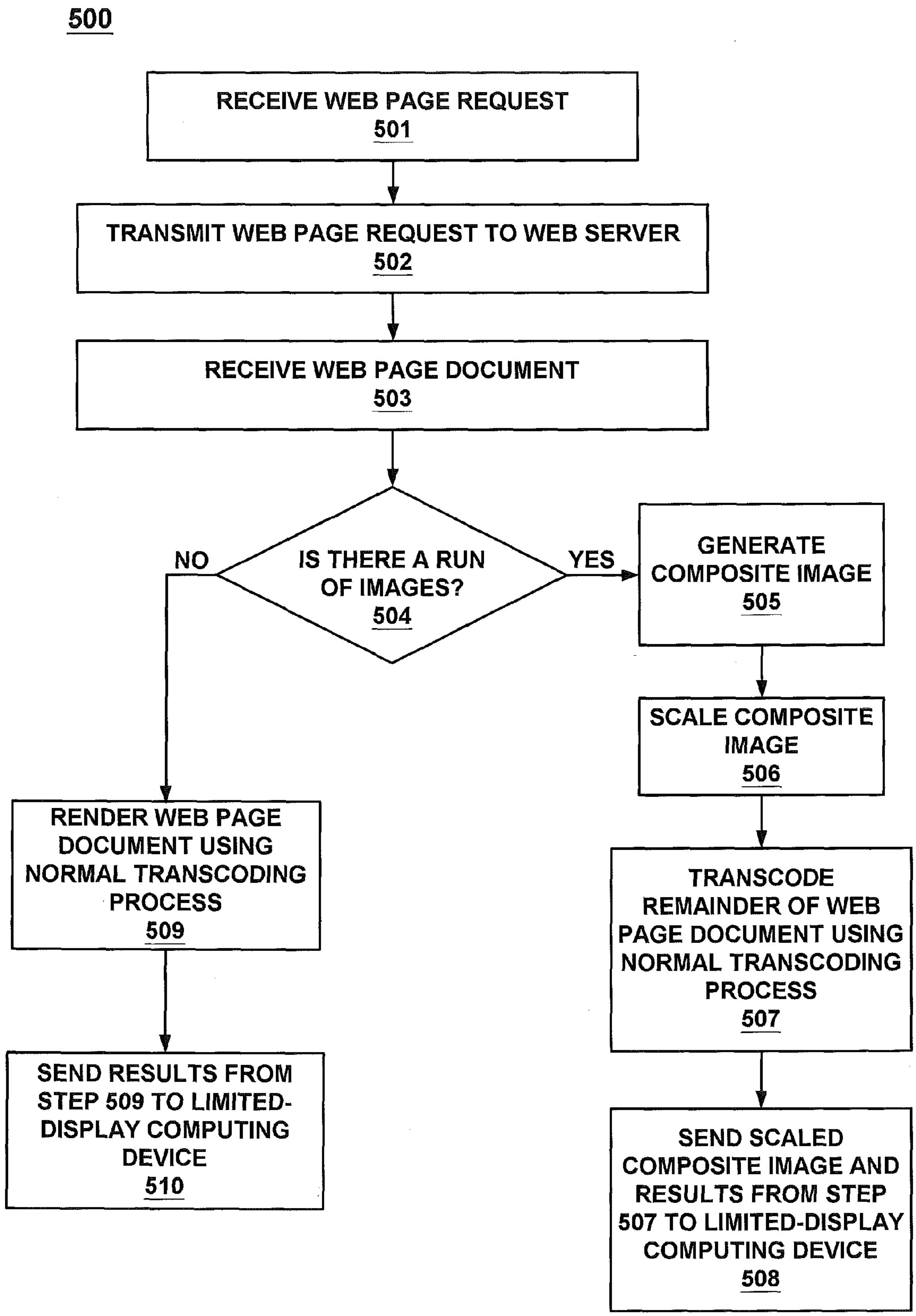
FIG. 5 is a flow chart describing a method for transcoding web page content for a limited-display computing device in accordance with an embodiment of the present invention.

Method for Transcoding Web Page Content for a Limited-Display Computing Device FIG. 5 is a flowchart 500 of steps performed in accordance with one embodiment of the present invention for delivering web-page content for a limited-display computing device. Flowchart 500 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium (e.g., removable storage devices such as compact disks, flash memory storage devices, floppy disks, digital video disks, etc.). Although specific steps are disclosed in flowchart 500, such steps are exemplary. That is, the present invention is well suited to performing various other steps or variations of the steps recited in FIG. 5. Within the present embodiment, it should be appreciated that the steps of flowchart 500 may be performed by software or hardware or any combination of software and hardware.

As shown by step 501, upon receiving a web page request from a limited-display computing device, the web page request is sent to a web server that contains the requested web page content as shown by step 502. In the present embodiment, this is done by sending the web page request using the address indicated in the web page request.

The server computer then responds by sending web page content that includes a web page document that is used to generate a display. This web page content is then received as shown by step 503. In one embodiment, the web page document is written in a Standard Generalized Markup Language (SGML) such as Hypertext Markup Language (HTML). However, it is appreciated that the present invention is applicable to any type of web page document that can be used to generate a display and more particularly, to any type of web page document that includes references to images that are to be included in the display.

The web page document is searched for runs of images. The term "run of images" as used in the present Application includes textual references to images that are directly adjoining, and textual references to images that are conceptually linked by virtue of being included in a common formatting object (e.g., a table or a frame). In the present embodiment, whenever a formatting object includes multiple textual references to images, all of the images within the formatting object comprise a run of images (irrespective of whether the textual references to the images are directly adjoining in a visual sense). Thus, whenever a HTML table includes multiple textual references to images, all of the images within the HTML table comprise a run of images. Similarly, when a HTML frame includes multiple textual references to images, all of the images within the HTML frame comprise a run of images.

If the web page document does not include a run of images (sequences of textual references to images that are directly adjoining or conceptually linked) as shown by steps 504 and 509, the web page document is transcoded according to the normal transcoding process of the transcoding proxy server. The results from the normal transcoding process are then sent to the limited-display computing device as shown by step 510.

When the web page document includes run of images as shown by steps 504-505, each of the images represented by a textual reference in the run of images are rendered so as to generate a single composite image. In the present embodiment, the images are rendered in an image size corresponding to the image size of a full-size display screen. This results in a composite image that is a full-size image.

As shown by step 506, the composite image is scaled. In the present embodiment, the composite image is scaled to meet the display requirements of the limited-display computing device. In addition, in one embodiment, the bit depth of the composite image is reduced to meet the display requirements of the limited-display computing device.

In the present embodiment, the composite image is scaled proportionally according to the width of the display of the limited-display computing device. That is, in an example in which the web page image extends across the full width of the full-sized display (e.g., image 601 of FIG. 6) and in which the limited-display computing device has a width of 160 pixels, the width of the image is scaled to 160 pixels with the height of the image being the height necessary to achieve a proportional image (e.g., the aspect ratio of the composite image is maintained).

In the present embodiment, the remainder of the web page document (all of the web page document except the sequence of images that are directly adjoining or conceptually linked) is transcoded according to the normal transcoding process. In one embodiment, standard transcoding software is used to transcode the remainder of the document. In the present embodiment, the results of the normal transcoding process are included in the transmission of step 507 to provide transcoded content to the limited-display computing device.

The scaled composite image is then sent to the limited-display computing device, along with the results of the normal transcoding process (step 507) as shown by step 508. In the embodiment shown in FIG. 3, the resulting transcoded content is sent from transcoding proxy server 54 to base station 41 via existing telephone network 42. Base station 41 then transmits one or more wireless transmission that is received by limited-display computing device 10*a*.

In the embodiment shown in FIGS. 3-4, transcoding proxy server 54 is operable to perform steps 501-508. In this embodiment, transcoding proxy server 54 receives the web page request (step 501) from limited-display computing device 10-10*a* and transmits (step 502) the web page request to web content server 56 or web content server 58 via the Internet 52. The response from web content server 56 or web content server 58 is then received by transcoding proxy server 54 (step 503). Transcoding proxy server 54 then searches the web page document for a run of sequential images (504). If a run of sequential images is found, each of the images in the run of textual references to images is rendered to generate a composite image (step 505). In the present embodiment, the composite image is rendered as a single full-size graphics context that is then stored in memory of transcoding proxy server 54 (e.g., RAM 102 shown in FIG. 1). The graphics context is then scaled (step 506) by transcoding proxy server 54 to generate a new graphics context. Transcoding proxy server 54 also transcodes the remainder of the web page document using the normal transcoding process (507) and sends the new graphics context, along with the results from the normal transcoding process, to limited-display computing device 10-10*a*.

In the present embodiment, if more than one run of images is found, each run of images is rendered separately to create a composite image (step 505). Thus, for example, if two runs of images are found, two composite images will be generated. Each generated composite image is then separately scaled (step 506) to produce a new graphics context that is sent to the limited-display computing device (step 508)

FIG. 6 shows an exemplary full-size display 600 generated by a website (e.g., website 56 or 58 of FIGS. 2-3). Display 600 is shown to include header 602, navigation bar 603, graphics 610 and text 604.

FIGS. 9-10 show portions of an exemplary HTML web page document 900 that generates display 600 of FIG. 6. A search of HTML web page document 900 in accordance with step 502 of FIG. 5 reveals table 901 that includes multiple textual references to images. More particularly, table 901 includes textual references to images 902-906. Because textual references to images 902-906 are disposed in a common formatting object (HTML table 901), each of images 902-906 comprise a run of images. More particularly, table 901 includes text that refers to image 902 (the phrase "img src="images/page-head-tl.jpg"), text that refers to image 903 (the phrase "img src="images/page-head-tm.jpg"), text that refers to image 904 (the phrase "img src="images/page-head-bl.jpg"), text that refers to image 905 (the phrase "img src="images/page-head-bm.jpg"), text that refers to image 906 (the phrase "img src="images/page-corner-tr.gif"). In the present embodiment, images 902-906, when displayed on a full size display generate image 602 of FIG. 6.

Figure 7A:
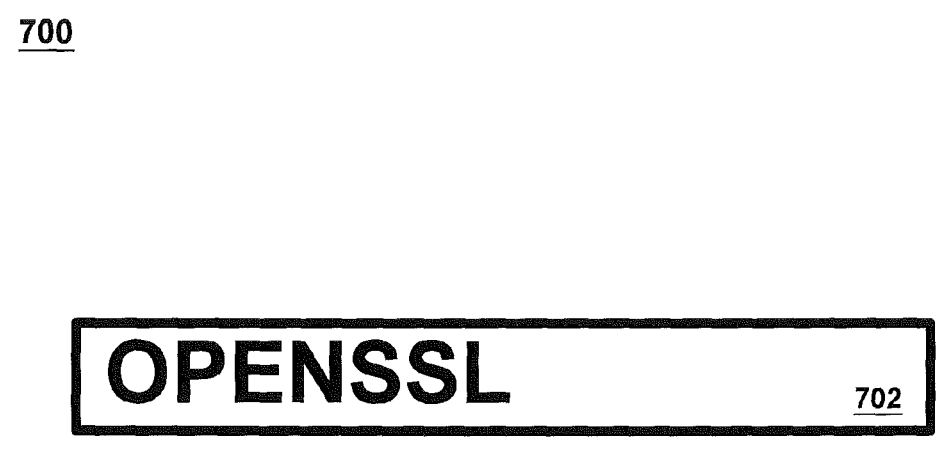
FIG. 7*a* is an example of a first scaled image generated for a limited-display computing device from the full-size web page shown in FIG. 6 in accordance with an embodiment of the present invention.

FIG. 7*a* shows an exemplary scaled composite image 702 on a display 700. In the present embodiment, scaled composite image 702 is produced by rendering images 902-906 to generate a composite image (step 505), which is scaled (step 506), for display on a limited-display computing device.

Referring now to FIG. 10, more of exemplary HTML web page document 900 is shown. A search of HTML web page document 900 in accordance with step 504 of FIG. 5 reveals run of images 940 that includes images 942-957. Images 942-957 are not contained within a common formatting object. Thus, they do not constitute conceptually linked images. However, the text that refers to each of images 942-957 is directly adjoining. Therefore, images 942-957 constitute a run of images. More particularly, the text that refers to image 942, (the HTML code "img_FAQ_n.src="images/page-navbar-fq-n-jpg"") is directly vertically adjoining text that refers to image 943 (the HTML code "img_FAQ_n.src="images/page-navbar-fq-s-jpg""). Though the text that refers to image 942 and the text that refers to image 943 are misaligned, they do directly adjoin each other vertically, and hence they constitute a run of images. Run of images 940 continues with the text that refers to image 944 (the HTML code "img_FAQ_n.src="images/page-navbar-ab-n-jpg"") which is directly vertically adjoining both the text that refers to image 943 and the text that refers to image 945 (the HTML code "img_FAQ_n.src="images/page-navbar-ab-s-jpg""). Similarly, run of images 940 includes images 946-957 because the text that refers to each of images 946-957 directly adjoins text that refers to another image vertically. In the present embodiment, images 942-957, when displayed on a full size display generate image 603 of FIG. 6.

In the present embodiment, to determine whether the text that refers to images are adjoining, table rows are carried out to the full width of each table row such that the beginning of each table row is aligned (each table row is shown in a subsequent line) as shown in FIG. 9.

In the present embodiment, the process of rendering images 946-957 is performed in a conventional manner as to generate the image that would result on a normal web page display that only includes the rendered images. Thus, for example, in the present embodiment, each of images 942, 944, 946, 948, 950, 952, 954, and 956 are combined to produce a composite image. Because images 943, 945, 947, 949, 951, 953, 955, and 957 are only displayed on mouseover (they are identified with the phrase "o.src"), these images are not normally rendered to produce the web page display. However, in an alternate embodiment of the present invention, all of the images in the run of images are combined to produce a composite image, irrespective of whether the images are only rendered during mouseover.

Figure 7B:
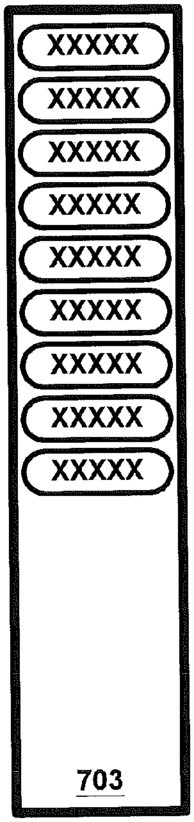
FIG. 7*b* is an example of a second scaled image generated for a limited-display computing device from the full-size web page shown in FIG. 6 in accordance with an embodiment of the present invention.

In one embodiment, when images 942-957 are rendered to generate a composite image (step 505), which is scaled (Step 506), an exemplary display 780 results that can be displayed on a limited-display computing device. Display 780 includes scaled composite image 703 of FIG. 7*b*. It can be seen that scaled composite image 703 is similar to image 603.

Though composite image 702 is shown to be quite similar to image 602 and image 703 is quite similar to image 603, composite images 702-703 include portions of images that would only be displayed conditionally. More particularly, images 602 and 603 change according to mouse movement to make numerous different images that are similar to images 602-603 but which include various changes (e.g., different colors, moving elements, appearing and disappearing icons, etc.).

Figure 8:
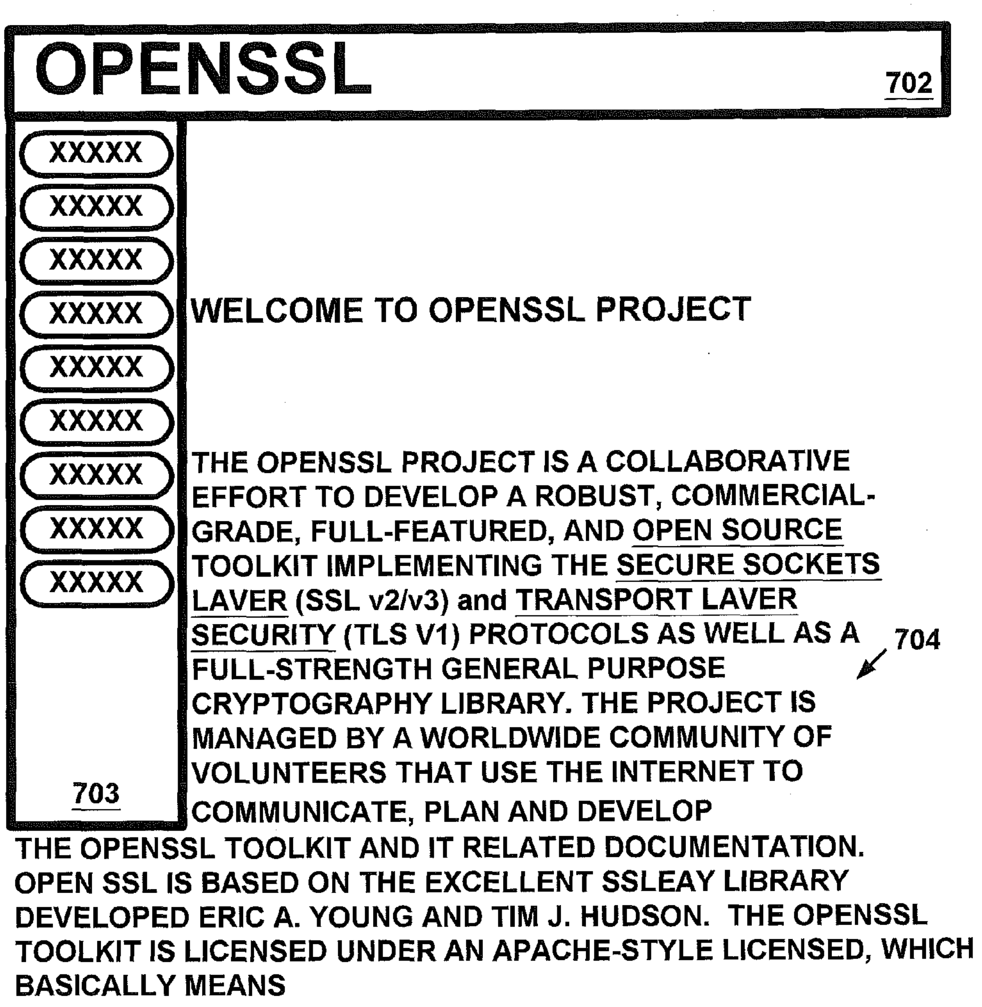
FIG. 8 is an example of a display generated for a limited-display computing device from the full-size web page shown in FIG. 6 in accordance with an embodiment of the present invention.

FIG. 8 shows an exemplary display generated by performing steps 501-508 of FIG. 5 so as to generate exemplary display 800. In the present embodiment, it can be seen that scaled composite images 702-703 resemble the original displayed images that made up header 602 and navigation bar 603. Text 704 is displayed on the remainder of the screen. In the present embodiment, text 704 is generated in step 507 of FIG. 5 by transcoding the remainder of HTML page 600 using normal transcoding methods. In the present embodiment, normal transcoding methods include the display of text only using a "best guess" process.

Referring still to display 800 of FIG. 8, it can be seen that scaled composite images 702-703 give a look and feel to image 800 that is similar to the look and feel of the images that would be displayed on a full size display (e.g., header 602 and navigation bar 603). However, the resulting display 800 includes extensive text 804, which is viewed by scrolling down until all of text 804 has been displayed. However, the resulting display 800 includes extensive text 704, which is viewed by scrolling down until all of text 704 has been displayed.

Because the scaled composite images that are transmitted to the limited-display computing device are proportionately scaled and are representative of the images that make up the full-size web image, the image generated on the limited-display viewing device fully conveys the look and feel of a full-size web page display. In addition, by combining images into a composite, the images are not transcoded individually, eliminating the confusion and inconvenience presented by the display of numerous individually transcoded images in a vertically extensive display.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method for transcoding web-page content for a limited-display computing device comprising the steps of:

a) upon receiving a web page request from a limited-display computing device, sending the web page request to a server computer that contains the requested web page document;

b) receiving from said server computer a web page document that can be used to generate a display;

c) searching said web page document for sequences of textual references directly adjoining each other, said textual references refer to images;

d) when said web page document includes more than one textual references directly adjoining each other, rendering each of the images represented by said textual references so as to generate a composite image, said textual references comprising conceptual linking in a common formatted object;

e) scaling each composite image rendered in step d) to meet the display requirements of said limited-display computing device; and f) sending each composite image scaled in step e) to said limited-display computing device;

wherein all of said web page document except said images rendered in step d) are transcoded using a normal transcoding process and are sent in step f) to said limited-display computing device.

2. The method of claim 1 wherein said web page document is written in a Hypertext Markup Language (HTML).

3. The method of claim 2 wherein said more than one textual references to images are directly adjoining vertically.

4. The method of claim 1 wherein step d) further comprises:

d1) when said web page document includes a formatting object that includes a plurality of the textual references, rendering each of the images represented by a textual reference to an image that is disposed in said formatting object so as to generate a composite image.

5. The method as recited in claim 1 wherein step e) further includes reducing the bit depth of said composite image to meet the display requirements of said limited-display computing device.

6. The method as recited in claim 1 wherein said images rendered in step d) are rendered to an image size corresponding to the image size of a full-size display screen.

7. The method as described in claim 1 wherein said limited-display computing device is selected from the group consisting of handheld computing device, a mobile phone, a pager, and an Internet appliance.

8. A computer-implemented method for transcoding web-page content for a limited display computing device comprising the steps of:

a) upon receiving a web page request from a limited-display computing device, sending the web page request to a server computer that contains the requested web page document;

b) receiving from said server computer a web page document that can be used to generate a display;

c) searching said web page document for formatting objects that include more than one textual references directly adjoining each other, said textual references refer to images;

d) when said web page document includes a formatting object that includes a plurality of the textual references, rendering each of the images represented by said textual references to an image that is disposed in said formatting object so as to generate a composite image, said textual references comprising conceptual linking in a common formatted object;

e) scaling each composite image rendered in step d) to meet the display requirements of said limited-display computing device; and f) sending each composite image scaled in step e) to said limited-display computing device;

wherein all of said web page document except said images rendered in step d) are transcoded using a normal transcoding process and are sent in step f) to said limited-display computing device.

9. The method of claim 8 wherein said web page document is written in a Hypertext Markup Language (HTML).

10. The method of claim 9 wherein said formatting object is a table.

11. The method of claim 9 wherein said formatting object is a frame.

12. The method of claim 8 wherein step d) further comprises:

d1) when said web page document includes more than one textual references directly adjoining each other, said textual references refer to images, rendering each of the images represented by said textual references so as to generate a composite image.

13. The method as recited in claim 8 wherein step e) further includes reducing the bit depth of said composite image to meet the display requirements of said limited-display computing device.

14. The method as recited in claim 8 wherein said images rendered in step d) are rendered to an image size corresponding to the image size of a full-size display screen.

15. The method as described in claim 8 wherein said limited-display computing device is selected from the group consisting of handheld computing device, a mobile phone, a pager, and an Internet appliance.

16. In a computer system including a processor coupled to a bus, and a memory unit coupled to the bus for storing information, a computer implemented method for transcoding web-page content for a limited-display computing device comprising the steps of:

a) upon receiving a web page request from a limited-display computing device, sending the web page request to a server computer that contains the requested web page document;

b) receiving from said server computer a web page document that can be used to generate a display;

c) searching said web page document for more than one textual references directly adjoining each other, said textual references refer to images, and for formatting objects that include a plurality of textual references, said textual references adjoining each other, said textual references refer to images;

d) when said web page document includes more than said one textual references, rendering each of the images represented by said textual references so as to generate a composite image, said textual references comprising conceptual linking in a common formatted object;

e) when said web page document includes a formatting object that includes said more than one textual references, rendering each of the images represented by a textual reference to an image that is disposed in said formatting object so as to generate a composite image;

f) scaling each composite image rendered in steps d) and e) to meet the display requirements of said limited-display computing device; and g) sending each composite image scaled in step e) to said limited-display computing device;

wherein all of said web page document except said images rendered in step d) are transcoded using a normal transcoding process and are sent in step f) to said limited-display computing device.

17. The computer implemented method as described in claim 16 wherein said web page document is written in a Hypertext Markup Language (HTML).

18. The method of claim 16 wherein said formatting object is a table.

19. The method of claim 16 wherein said formatting object is a frame.

20. A computer-implemented method for transcoding webpage content for a limited-display comprising the steps of:

a) upon receiving a web page request from a limited-display computing device, sending the web page request to a server computer that contains the requested web page document;

b) receiving from said server computer a web page document that can be used to generate a display;

c) searching said web page document for sequences of textual references directly adjoining each other, said textual references refer to images;

d) when said web page document includes more than one said textual references, rendering each of the images represented by said textual references so as to generate a composite image;

e) scaling each composite image rendered in step d) to meet the display requirements of said limited-display computing device; and f) sending each composite image scaled in step e) to said limited-display computing device;

wherein all of said web page document except said images rendered in step d) are transcoded using a normal transcoding process and are sent in step f) to said limited-display computing device.

* * * * *